United States Patent
Jiao et al.

(10) Patent No.: US 12,152,482 B2
(45) Date of Patent: Nov. 26, 2024

(54) UNDISTORTED OUTSPREAD METHOD FOR ANNULAR IMAGES OF THE INNER WALL OF BOREHOLE WITH A CENTER OFFSET

(71) Applicant: CHINA UNIVERSITY OF MINING AND TECHNOLOGY, Xuzhou (CN)

(72) Inventors: Wenhua Jiao, Xuzhou (CN); Xu Zhou, Xuzhou (CN)

(73) Assignee: CHINA UNIVERSITY OF MINING AND TECHNOLOGY CHINA (CN)

(*) Notice: Subject to any disclaimer, the term of this patent is extended or adjusted under 35 U.S.C. 154(b) by 0 days.

(21) Appl. No.: 18/373,313

(22) Filed: Sep. 27, 2023

(65) Prior Publication Data
US 2024/0209725 A1 Jun. 27, 2024

Related U.S. Application Data

(63) Continuation of application No. PCT/CN2022/143201, filed on Dec. 29, 2022.

(30) Foreign Application Priority Data

Dec. 27, 2022 (CN) .................. 202211687031.X

(51) Int. Cl.
G06T 3/40 (2024.01)
E21B 47/002 (2012.01)
(Continued)

(52) U.S. Cl.
CPC .............. *E21B 47/002* (2020.05); *G06T 3/40* (2013.01); *G06T 3/602* (2013.01); *G06T 7/20* (2013.01); *G06V 10/24* (2022.01); *G06V 10/761* (2022.01)

(58) Field of Classification Search
None
See application file for complete search history.

(56) References Cited

U.S. PATENT DOCUMENTS 5,565,624 A * 10/1996 Deboaisne .............. E21B 47/08
702/10
11,532,092 B2 * 12/2022 LeFranc ................. G06V 10/50
(Continued)

FOREIGN PATENT DOCUMENTS

CN 104811630 A 7/2015
CN 104915640 A 9/2015
(Continued)

OTHER PUBLICATIONS

STIC provided English machine translation of CN 105931219 A (Year: 2016).*
(Continued)

*Primary Examiner* — Tyler W. Sullivan

(57) ABSTRACT

An undistorted outspread method for annular images of the inner wall of borehole with center offset comprises putting camera into borehole and pushing camera inward to carry out video acquisition; selecting two frames of images, first image and second image, from the video obtained; adjusting second axis angle in second image to same angle as first axis angle in first image; adjusting first axis angle and adjusted second axis angle in S2 until difference between angle is zero; calculating first radius ratio of motion according to adjusted first image and second image, and obtaining second radius ratio of motion; obtaining first radius ratio of axis distance according to first radius ratio of motion, and obtaining second radius ratio of axis distance; correcting first radius ratio of axis distance and second radius ratio of axis distance to obtain third image and fourth image; outspreading undistorted image to obtain undistorted outspread image.

8 Claims, 8 Drawing Sheets

(51) Int. Cl.
*G06T 3/602* (2024.01)
*G06T 7/20* (2017.01)
*G06V 10/24* (2022.01)
*G06V 10/74* (2022.01)

(56) References Cited

U.S. PATENT DOCUMENTS

2012/0236139 A1* 9/2012 Chang .................... G01B 11/24
348/88
2021/0332692 A1 10/2021 Nguyen et al.

FOREIGN PATENT DOCUMENTS

| CN | 105931219 A | * | 9/2016 | ............... G06T 7/60 |
| CN | 106548456 A | | 3/2017 | |
| CN | 110378884 A | * | 10/2019 | ......... G01N 21/8851 |
| CN | 113506208 A | | 10/2021 | |
| CN | 113470108 B | * | 2/2022 | |
| CN | 114841922 A | | 8/2022 | |

OTHER PUBLICATIONS

STIC provided English Machine Translation of CN 110378884 A (Year: 2019).*
STIC provided English Machine Translation of CN 113470108 B (Year: 2022).*

* cited by examiner

UNDISTORTED OUTSPREAD METHOD FOR ANNULAR IMAGES OF THE INNER WALL OF BOREHOLE WITH A CENTER OFFSET

CROSS REFERENCE TO THE RELATED APPLICATIONS

This application is a continuation application of International Application No. PCT/CN2022/143201, filed on Dec. 29, 2022, which is based upon and claims priority to Chinese Patent Application No. 202211687031.X, filed on Dec. 27, 2022, the entire contents of which are incorporated herein by reference.

TECHNICAL FIELD

The invention relates to the field of borehole image analysis technology, in particular to an undistorted outspread method for annular images of the inner wall of borehole with a center offset.

BACKGROUND

The digital core is an interdisciplinary subject in the field of image processing and petroleum, coal, and other geological fields. Digital core technology uses computer image processing technology to depict the core microstructure in the form of images and provides basic research data for the exploration and development of petroleum, coal, and other geological science exploration through mathematical modeling, quantitative analysis, and simulation of various characteristics of strata.

Digital core technology usually requires drilling the rock mass first, then a wide-angle camera goes deep into the borehole to collect videos, and then the collected wide-angle images are outspread and spliced into a panoramic image so that the internal situation of the rock mass can be intuitively obtained, which provides a safe decision-making basis for the density selection of the supporting hydraulic support of the underground space excavation face such as coal mine roadway and tunnel.

Because it is difficult to ensure that the camera coincides with the optical axis of the hole center during the actual acquisition of the borehole image, that is, the center of the lens cannot guarantee to coincide with the center of the borehole, and there is usually a center offset. There will be some nonlinear distortions in the collected images, which will cause the subsequent mosaic images to be inaccurate, making it difficult to obtain the real internal conditions of the rock mass. The obtained geological information error will be very large if it is not corrected. The premise and core difficulty of correction is to solve the ratio of the distance between the optical axis of the single frame image camera and the center axis of the borehole to the radius of the borehole, and the angle between the connection of the two optical axes and the positive direction of the image after imaging (the positive direction of the image from left to right is stipulated).

There are two existing solutions. One solution is to add additional sensors to the camera, such as a laser sensor, which can emit a laser, a laser ring will be formed when the laser hits the inner wall of the borehole. By calculating the deviation between the laser ring and the standard circle, the distance between the optical axis of the camera and the inner wall of the borehole can be obtained, so the parameters to be corrected are obtained.

The other solution is to directly use the morphological method, such as using the Hough transform or least square method to fit the center circle. The principle of its dependence is that the gray value of the ring at the same depth is approximated, and the position of the ring center on the image is obtained. The angle and distance between the center of the circle and the center of the image can be solved. However, usually, only the pixels in the center circle area are calculated according to the gray value, and the number of pixels in the middle is small. At the same time, in complex scenes, the gray value is also difficult to characterize the ring at the same depth. The distortion correction parameters calculated by the morphological method have a large deviation angle error, and the accuracy of the correction parameters is low.

SUMMARY

The purpose of the invention is to provide an undistorted outspread method for annular images of the inner wall of borehole with a center offset, it solves the problem that there is an error in the calculation of distortion correction parameters in the morphological method.

In order to achieve the above purpose, the invention provides an undistorted outspread method for annular images of the inner wall of borehole with a center offset.

S1, putting a camera into a hole and pushing the camera inward to carry out a video acquisition;

S2, selecting two frames of images from the video obtained from S1, namely FIG. 1 and FIG. 2; adjusting axis angle 2 in FIG. 2 to the same angle as axis angle 1 in FIG. 1;

S3, adjusting axis angle 1 and adjusted axis angle 2 in S2 until the angle is zero;

S4, calculating a radius ratio of motion 1 according to adjusted FIG. 1 and FIG. 2 in S3, and similarly, obtaining radius ratio of motion 2;

S5, obtaining radius ratio of axis distance 1 according to radius ratio of motion 1 in S4, and similarly, obtaining radius ratio of axis distance 2;

S6, correcting FIG. 1 and FIG. 2 to obtain FIG. 3 and FIG. 4 according to the calculation of radius ratio of axis distance 1 and radius ratio of axis distance 2 in S5;

S7, matching FIG. 3 in S6 along with FIG. 1 and matching FIG. 4 in S6 along with FIG. 2 to obtain a corrected undistorted image;

S8, outspreading the undistorted image in S7 to obtain an undistorted outspread image according to a polar coordinate formula.

Preferably, in S2, if the angle of axis angle 2 is different from that of axis angle 1, obtaining phase angle diagram 1 from FIG. 1 and FIG. 2, and phase angle difference obtained from phase angle 1 and phase angle 2 in phase angle diagram is equal to axis angle difference, and rotating FIG. 2 according to axis angle difference.

Preferably, in S3, if axis angle 1 and axis angle 2 are not zero, obtaining phase angle diagram 2 from FIG. 1 and rotated FIG. 2, when all trajectory lines in phase angle diagram 2 intersect, a point with the most trajectory lines is control point, and obtaining detection circle 1 when using the control point as a center; obtaining axis angle 3 from two points with the largest pixel gray value on detection circle 1, and rotating FIG. 1 and rotated FIG. 2 according to axis angle 3.

Preferably, in S4, selecting any point in FIG. 1 after rotation and calculating the radius ratio of motion of this point; calculating radius ratio diagram of motion 1 from the radius ratio of motion calculated by all points in FIG. 1 after rotation, and similarly, obtaining radius ratio diagram of motion 2.

Preferably, in S5, selecting points with the same pixel gray value in radius ratio diagram of motion 1 and radius ratio diagram of motion 2 to obtain ring 1 and ring 2, obtaining radius ratio of axis distance 1 according to the center and radius of ring 1, and similarly, obtaining radius ratio of axis distance 2.

Preferably, in S6, obtaining corrected radius 1 and angle 1 according to radius ratio diagram of motion 1 and radius ratio diagram of motion 2, and obtaining corrected FIG. 3 and FIG. 4 from angle 1 and radius 1.

Preferably, both FIG. 1 and FIG. 2 take an image center as an origin, a x-axis is a straight line from the origin to the right, an axis angle is a angle between the x-axis and the line connecting the image center and a hole center, an offset axis is a connection between the image center and the hole center, and the length of the offset axis is an axis distance.

Preferably, radius ratio of motion 1 is a ratio of the distance from the point to the control point in FIG. 1 after rotation to the distance from the endpoint of the motion trajectory to the control point.

Preferably, radius ratio of axis distance 1 is a ratio of the radius to the distance from the center of the circle to the center of the image.

In S1, the images during the camera movement will be in the following four conditions, from simple to complex as follows.
(1) the axis distances between the two frames of images are equal but not 0, and the axis angle is equal to 0;
(2) the axis distances between the two frames of images are not equal and not 0, and the axis angle is equal to 0;
(3) the axis distances between the two frames of images are not equal and not 0, and the axis angle is equal but not 0;
(4) the axis distances between the two frames of images are not equal and not 0, and the axis angle is not equal and not 0.

When solving problems from (4) to (1), the steps in S2-S8 are adopted to solve the problem, and the corresponding correction steps in S2-S8 are used to correct the problem according to the different situations of the problem.

Therefore, an undistorted outspread method for annular images of the inner wall of borehole with a center offset has the following beneficial effects:
1. The use of edge rather than center pixels is more accurate than the use of intermediate pixels, and there will be no maximum offset angle error;
2. The axis distance and axis angle can be obtained through the trajectory of any point in the image, and it is not affected by complex factors such as gray value confusion, the accuracy is greatly improved;
3. It has a low cost and does not depend on independent hardware, real-time camera can also be an efficient use of all image information to obtain the average value even if the performance of the camera is poor, accurate results are obtained;
4. Multiple values are taken to calculate and eliminate outliers, it enhances the robustness of the algorithm and improves the accuracy;
5. The correction parameters of each frame image are calculated by the relative motion between the frames of the captured video, the distorted deformation image is corrected, and the complete undistorted outspread image of the inner wall is obtained after outspreading.

The invention is also applicable to endoscopic imaging technology for determining the diameter of the inner hole, which can be applied in the fields of opaque wine bottles, automobile engine inner holes, municipal pipeline inspection, and so on.

The following is a further detailed description of the technical solution of the invention through drawings and an embodiment.

DETAILED DESCRIPTION OF THE EMBODIMENTS

The following is a further explanation of the technical solution of the invention through drawings and an embodiment.

Unless otherwise defined, the technical terms or scientific terms used in the invention should be understood by people with general skills in the field to which the invention belongs. 'first', 'second', and similar words used in the invention do not mean any order, quantity or importance, but are only used to distinguish different components. Similar words such as 'include' or 'comprise' mean that the elements or objects appearing before the word cover the elements or objects listed after the word and their equivalents, without excluding other elements or objects.

Embodiment 1

Figure 1:
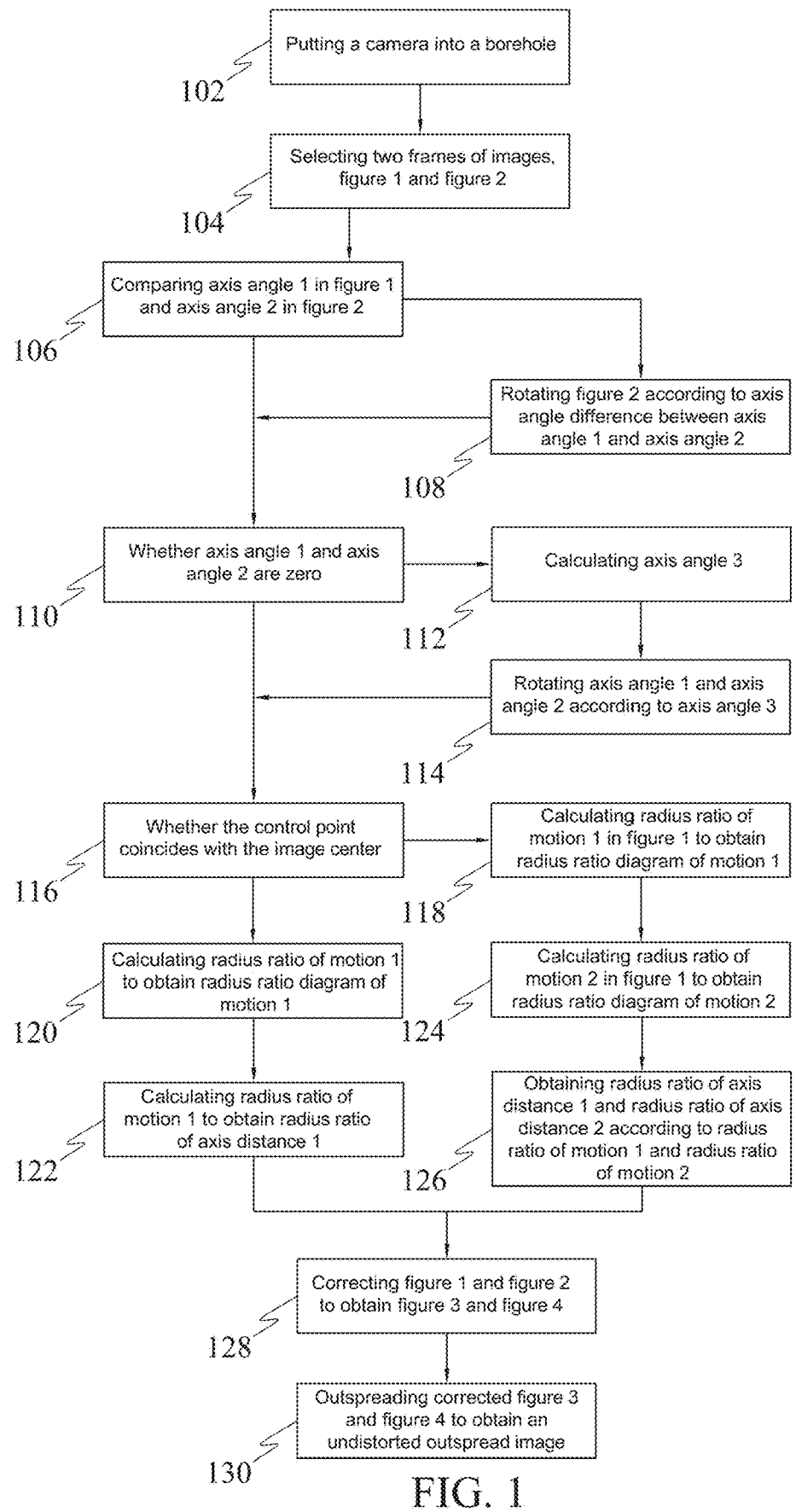
FIG. 1 is a flow chart of the undistorted outspread method for annular images of the inner wall of borehole with a center offset.
Figure 2:
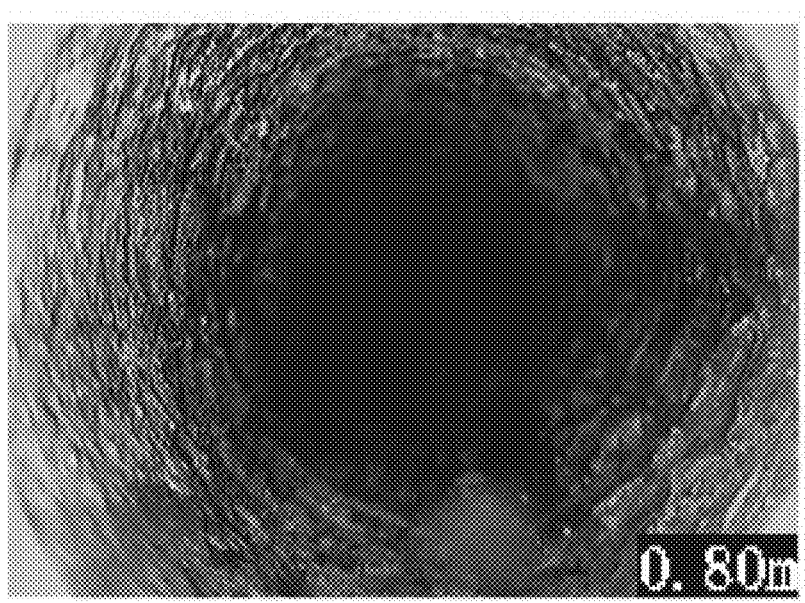
FIG. 2 is a schematic diagram of FIG. 1 in the undistorted outspread method for annular images of the inner wall of borehole with a center offset.

S1, putting a camera into a hole and pushing the camera inward to carry out a video acquisition at step 102;

S2, selecting two frames of images from the video obtained from S1 at step 104, namely FIG. 1 and FIG. 2; adjusting axis angle 2 in FIG. 2 to the same angle as axis angle 1 in FIG. 1; FIG. 1 is a frame of the previous moment, FIG. 2 is a frame of the next moment. By using an optical flow method, the moving trajectory of each point from FIG. 2 to FIG. 1 is obtained, which is the motion vector field of FIG. 2 relative to FIG. 1, denoted as field 1-2. The optical flow method is a calculation method in the existing technology, which is not described in detail here.

Field 1-2 is divided into a row offset graph and a column offset graph, a pixel gray value in the row offset graph is a row offset value of the midpoint of field 1-2, and a pixel gray value in the column offset graph is a column offset value of the midpoint of field 1-2. A tangent value of this point can be obtained from the row offset value and the column offset value, and a phase angle of this point can be obtained by bringing the tangent value into the arctangent function. Phase angle diagram 1 is obtained by the phase angles of all points.

Converting the row offset graph and the column offset graph into a distance, and the point on the obtained modular length graph is the distance of the trajectory distance of this point.

Axis angle 2 in FIG. 2 is adjusted to the same angle as axis angle 1 in FIG. 1. The axis angle 1 in FIG. 1 is compared with the axis angle 2 in FIG. 2 at step 106. If the angle of axis angle 2 is different from that of axis angle 1, FIG. 2 rotates relative to FIG. 1 at step 108. Taking the image center as the center of the circle and any length as the radius to make a detection circle, a phase angle from the point on the detection circle to the center of the circle is obtained. Then, a phase angle difference between phase angle 2 and phase angle 1 from the endpoint of the trajectory of the point to the center of the circle is obtained, and phase angle difference is an axis angle difference between axis angle 1 and axis angle 2.

Different diameters are selected to obtain different detection circles, and then the corresponding axial angle differences are obtained, the average value of multiple axial angle differences is taken, and FIG. 2 is rotated according to the average value of the axial angle differences.

S3, adjusting axis angle 1 and adjusted axis angle 2 in S2 until the angle is zero. At step 110, it is checked whether axis angle 1 and axis angle 2 are zero.

According to rotated FIG. 2 and FIG. 1, a vector motion field is recalculated as field 1-21. Phase angle diagram 2 and modular length graph 2 are obtained again according to field 1-21. When all trajectory lines in phase angle diagram 2 intersect, a point with the most trajectory lines is the control point.

A trajectory line is determined according to the coordinates of any point in phase angle diagram 2 and the pixel gray value, the pixel gray value in phase angle diagram 2 is a phase angle of the displacement of the point, the equation of the trajectory line can be determined according to the coordinates of a point on the straight line and the slope of the straight line. A point that has the most intersected trajectory lines is selected as the control point, and then the coordinates of the control point are obtained.

Taking the control point as the center of the circle, detection circle 1 is generated in modular length graph 2, and the two points with the largest pixel gray value on detection circle 1 are obtained, that is, the two points with the longest displacement. These two points are symmetrical about the offset axis, then axis angle 3 is calculated at step 112 as half of the sum of phase angles of the two points. By setting detection circle 1 of different radii, several axis angles are obtained, and the average value is taken after eliminating the outliers. FIG. 1 and rotated FIG. 2 are rotated according to axis angle three at step 114, and rotated FIG. 1 and double rotated FIG. 2 are obtained. At this time, the offset axis is aligned with the x-axis, and the positive direction of the x-axis is from left to right.

S4, calculating a radius ratio of motion 1 according to adjusted FIG. 1 and FIG. 2 in S3, and similarly, obtaining radius ratio of motion 2;

At step 118 radius ratio of motion 1 of any point in rotated FIG. 1 is obtained from rotated FIG. 1 and double rotated FIG. 2, radius ratio of motion 1 is a ratio of the distance from the point to the control point in FIG. 1 after rotation to the distance from the endpoint of the motion trajectory to the control point. From FIG. 2 and FIG. 3 of the next frame, radius ratio of motion 2 of any point in FIG. 2 is adjusted according to S2 and S3. Moreover, radius ratio diagram of motion 1 is obtained according to radius ratio of motion 1, and at step 124 radius ratio diagram of motion 2 is obtained according to radius ratio of motion 2.

At step 116, it is checked whether the control point coincides with the image center. If the control point coincides with the center of the image, then the center distance of rotated FIG. 1 is equal to that of double rotated FIG. 2. At this time, at step 120 only obtaining radius ratio diagram of motion 1 is enough. At step 122, radius ratio of motion 1 is calculated to obtain radius ratio of axis distance 1.

S5, at step 126 obtaining radius ratio of axis distance 1 and radius ratio of axis distance 2 are obtained according to radius ratio of motion 1 and radius ratio of motion 2 in S4, respectively. Because the points on the same motion trajectory are the points on the same depth ring in the physical space, and the radius ratio of motion is a fixed value and related to the physical depth. Therefore, the radius ratio of axis distance in the physical space can be accurately obtained.

The points with the same pixel gray value are selected from radius ratio diagram of motion 1, and ring 1 with the same depth is obtained, the center coordinates can be obtained from the radius of ring 1 and the points with the same pixel gray value, radius ratio of axis distance 1 is the ratio of the distance from the center of ring 1 to the center of the image to the radius. Several radii and center positions of ring 1 can be obtained, several radius ratios of axis distances can be obtained, and the radius ratios of axis distances of different ring 1 are averaged. Similarly, the average value of radius ratio of axis distance 2 is obtained from radius ratio diagram of motion 2.

Figure 3:
FIG. 3 is the schematic diagram of FIG. 2 in the undistorted outspread method of the annular images of the inner wall of the borehole with center offset.
Figure 4:
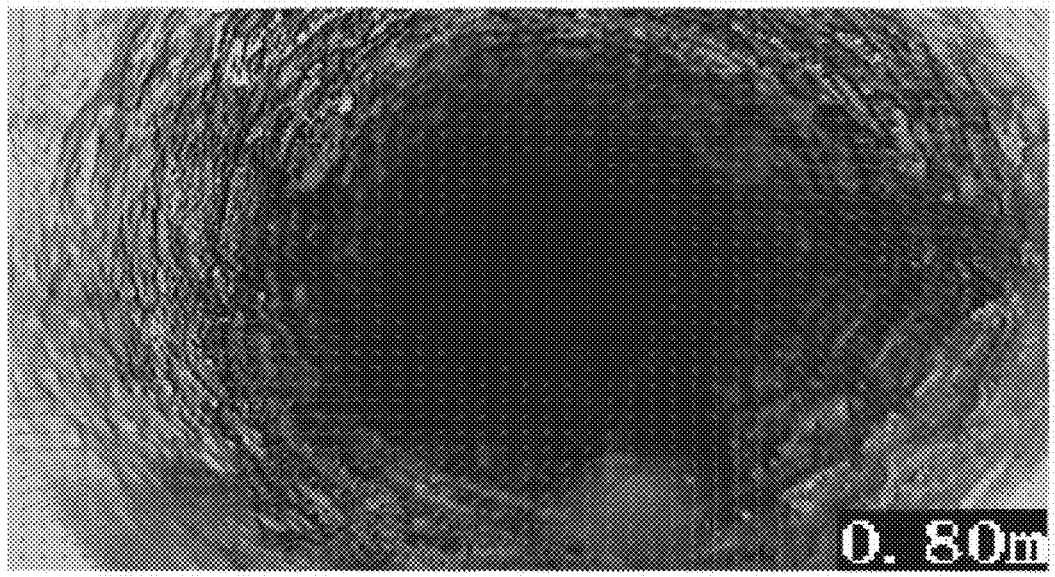
FIG. 4 is a schematic diagram of field 1-2 in the undistorted outspread method for annular images of the inner wall of borehole with a center offset.
Figure 5:
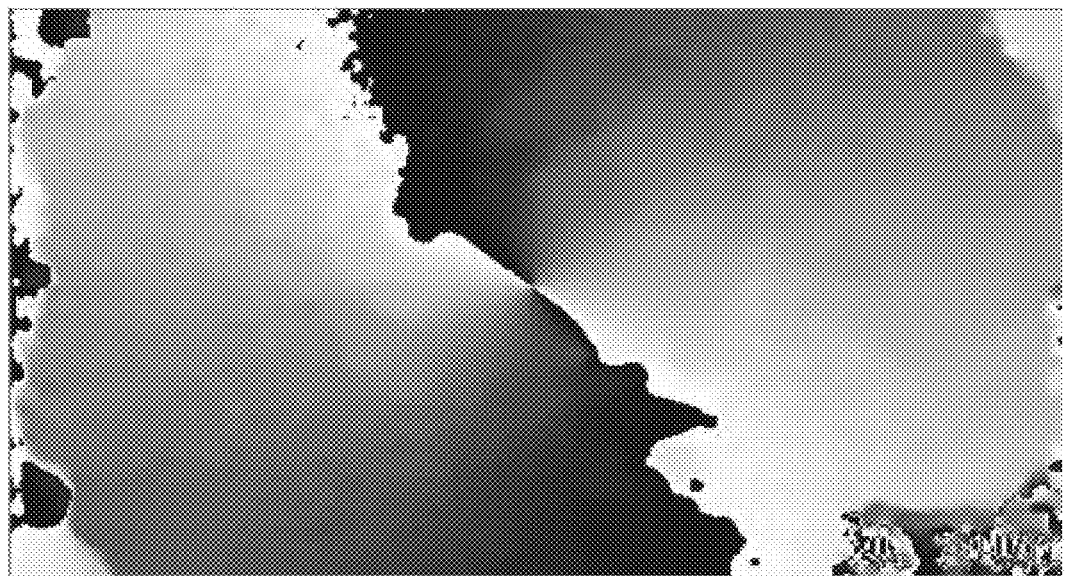
FIG. 5 is a schematic diagram of phase angle 1 in the undistorted outspread method for annular images of the inner wall of borehole with a center offset.
Figure 6:
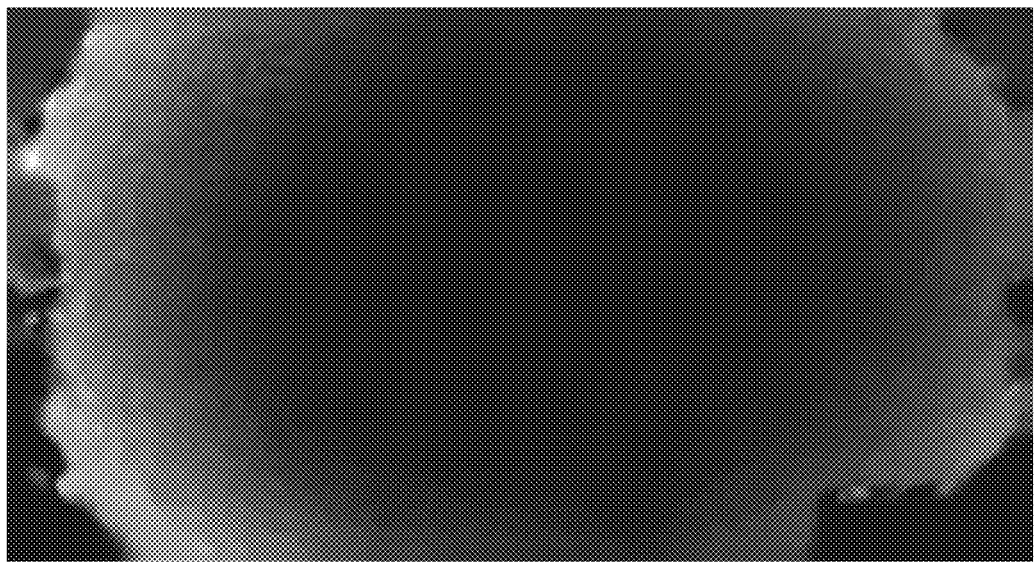
FIG. 6 is a schematic diagram of a modular length graph in the undistorted outspread method for annular images of the inner wall of borehole with a center offset.
Figure 7:
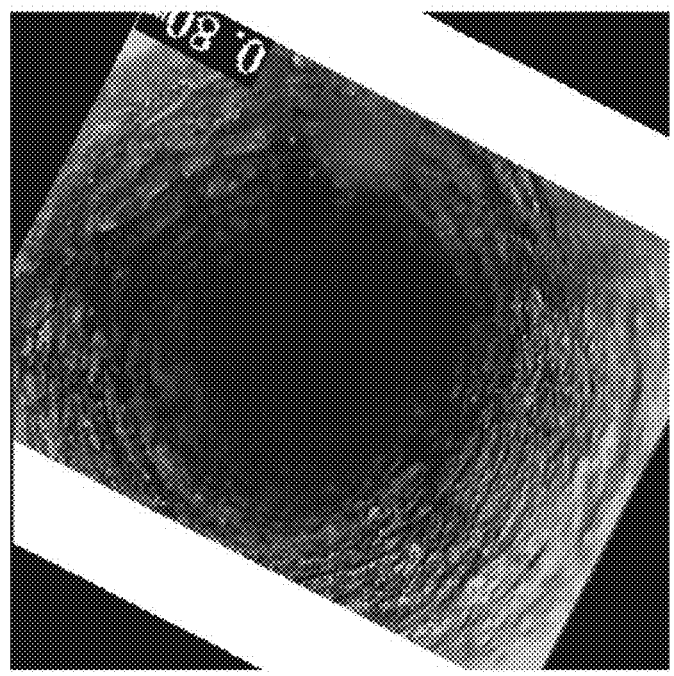
FIG. 7 is a schematic diagram of rotated FIG. 2 in the undistorted outspread method for annular images of the inner wall of borehole with a center offset.
Figure 8:
FIG. 8 is a schematic diagram of corrected FIG. 3 in the undistorted outspread method for annular images of the inner wall of borehole with a center offset.

S6, correcting FIG. 1 and FIG. 2 to obtain FIG. 3 and FIG. 4 according to the calculation of radius ratio of axis distance 1 and radius ratio of axis distance 2 in S5 at step 128;

Corrected radius: Due to the existence of the axis distance in the physical space, the distance from each group of points to the center of the circle can be obtained from the radius ratio of axis distance, and the radius ratio of axis distance is equal to the radius ratio of axis distance in the physical space. After the corrected center coincides with the image center, the radius value from the point to the image center can be obtained.

Figure 9:
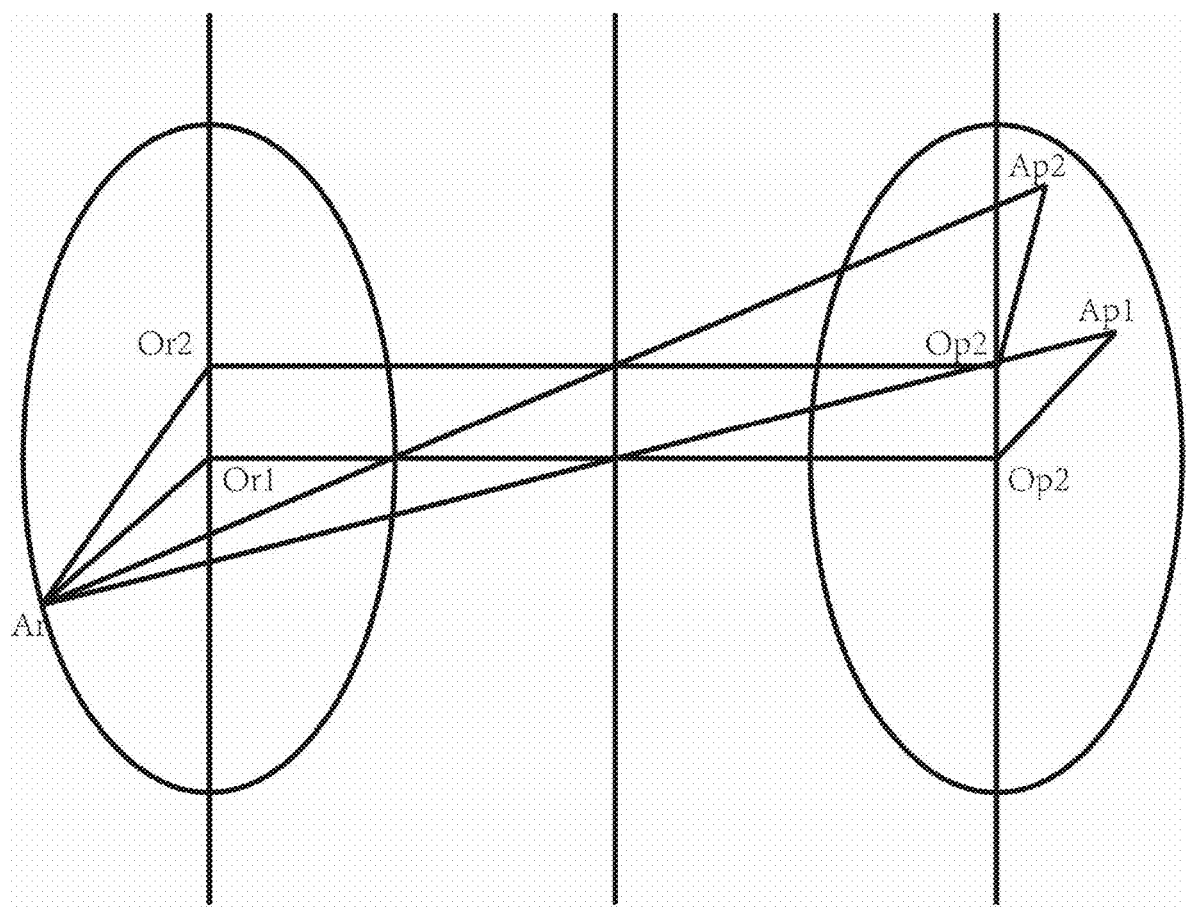
FIG. 9 is a calculation diagram in S6 in the undistorted outspread method for annular images of the inner wall of borehole with a center offset.

As shown in FIG. 9, the left side is a ring in the plane of the physical space, and the right side is a ring in the plane of the image plane. if there is no lens offset, for a point Ar in the physical space, its corresponding point in the image should be Ap1; If there is a lens offset, the corresponding point in the image should be Ap2.

$$\frac{ArOr1}{ArOr2} = \frac{Ap1Op1}{Ap2Op2}$$

Or1-Op1 is an axis of the lens in the center of the hole;
Or2-Op2 is an offset axis;
corrected radius Ap1Op1 is denoted by r1;
radius Ap2Op2 before correction is denoted by r2.

ArOr2 can be transformed into the functions of ArOr1 and Or1Or2 by cosine formula provided as equation (1), ArOr2 is related to the radius ratio of axis distance, therefore, the radius ratios before and after correction can be obtained by using the radius ratio of axis distance.

The angle after correction: due to the existence of the axis distance in the physical space, the functional relationship between the angle before correction and the angle after correction can be obtained from the radius ratio of axis distance.

There is a phase angle difference between a phase angle from the point to the center of the hole in the physical space and a phase angle from the corresponding point to the center of the image in FIG. 1. Phase angle difference can be obtained by using cosine formula provided as equation (1) and equation (2). In the triangle where a phase angle difference is located, the axis distance is one edge of the triangle, and the other two edges are the radii of the hole. The corrected radius is brought in to obtain the relationship between the radius ratio of the axis distance and the angle.

Figure 10:
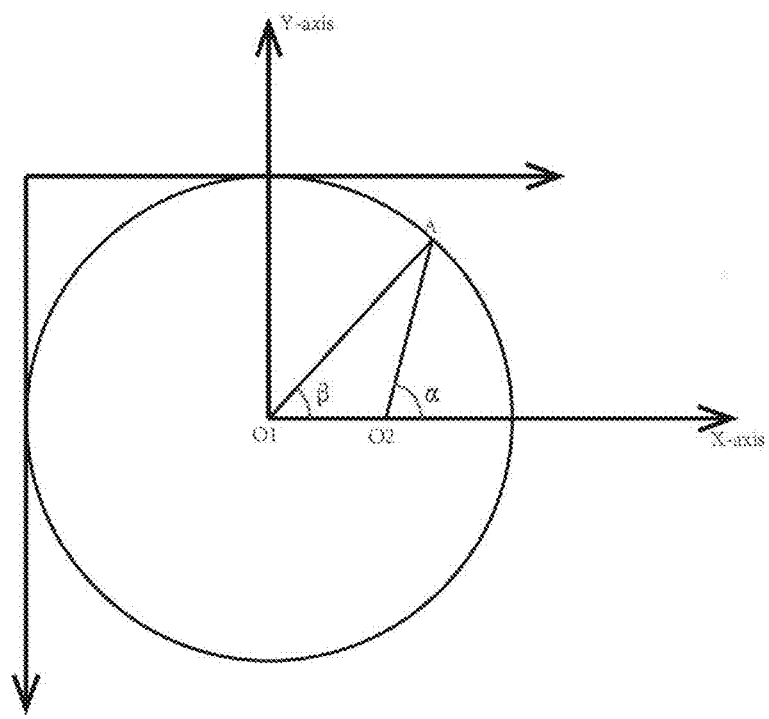
FIG. 10 is a calculation diagram in S6 in the undistorted outspread method for annular images of the inner wall of borehole with a center offset.

As shown in FIG. 10, it is an image of a layer of rings, and a coordinate system is established in the positive direction of the x-axis from the center of the hole O1 to the center of the image O2.

Using the cosine formula for $\angle \alpha$ to obtain:

$$\cos \alpha = \frac{AO_1^2 - O_1O_2^2 - AO_2^2}{2*O_1O_2*AO_2} \quad (1)$$

Using the cosine formula for $\angle \beta$ to obtain:

$$AO_2^2 = AO_1^2 + O_1O_2^2 - 2*AO_1*O_1O_2*\cos \beta \quad (2)$$

where: point A is a point on the image ring;
angle A-$O_2$-X axis is denoted by $\angle \alpha$;
angle A-$O_1$-X axis is denoted by $\angle \beta$;
$O_1O_2$ is the axis distance; $AO_1$ is the radius of the hole.

Because $AO_2$ is unknown, $O_1O_2$ and $AO_1$ can be known from the radius ratio of axis distance. By taking the cosine formula of $\angle \beta$ into the cosine formula of $\angle \alpha$, the functional relationship between $\angle \beta$ and $\angle \alpha$ is obtained.

S7, matching FIG. 3 in S6 along with FIG. 1 and matching FIG. 4 in S6 along with FIG. 2 to obtain a corrected undistorted image at step 130.

The radius and angle after correction are known, according to the polar coordinate formula, the image before correction can correspond to the corrected image one by one, and the corrected image without distortion can be obtained.

From the correspondence between the length and angle of the image coordinates before and after correction, the mapping of the coordinates before and after correction can be known, the corresponding formula of polar coordinates is as follows:

$$\begin{cases} x = W/2 + r_2 * \cos \alpha \\ y = H/2 - r_2 * \sin \alpha \end{cases} \quad (3)$$

Where W is the width of the image;
H is the height of the image;
in this formula, cos $\alpha$ is the function of $AO_1$ and $O_1O_2$ with cos $\beta$ in S6.

S8, outspreading the undistorted image in S7 to obtain an undistorted outspread image according to a polar coordinate formula.

In the undistorted image, the center of the image is the center of the hole, the projection of a certain section of the image in the hole can be obtained by taking a circle of different radii in the center of the image, the rectangular image is obtained after outspreading by using the polar coordinate formula to outspread.

Figure 11:
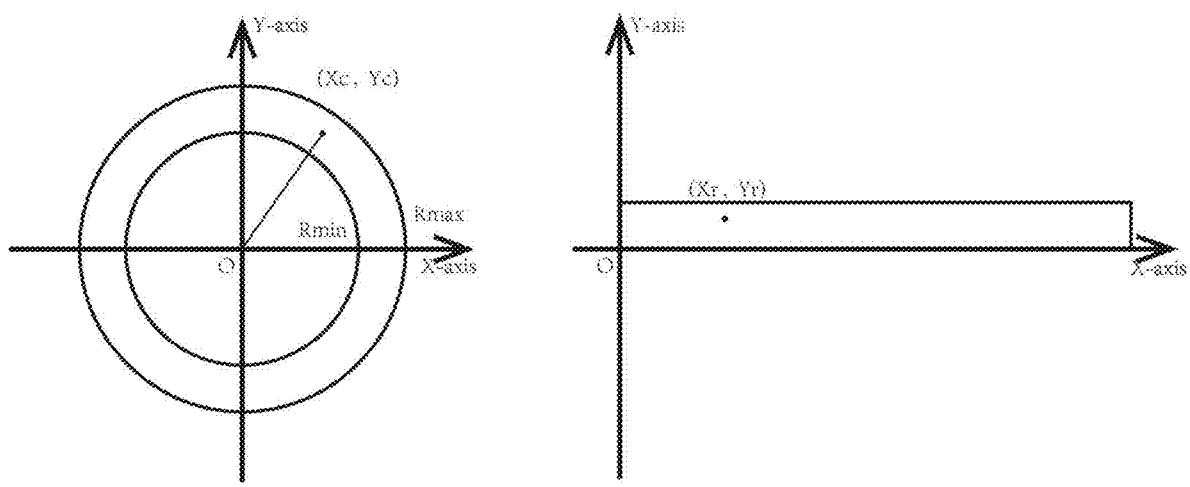
FIG. 11 is a calculation diagram in S8 in the undistorted outspread method for annular images of the inner wall of borehole with a center offset.
Figure 12:
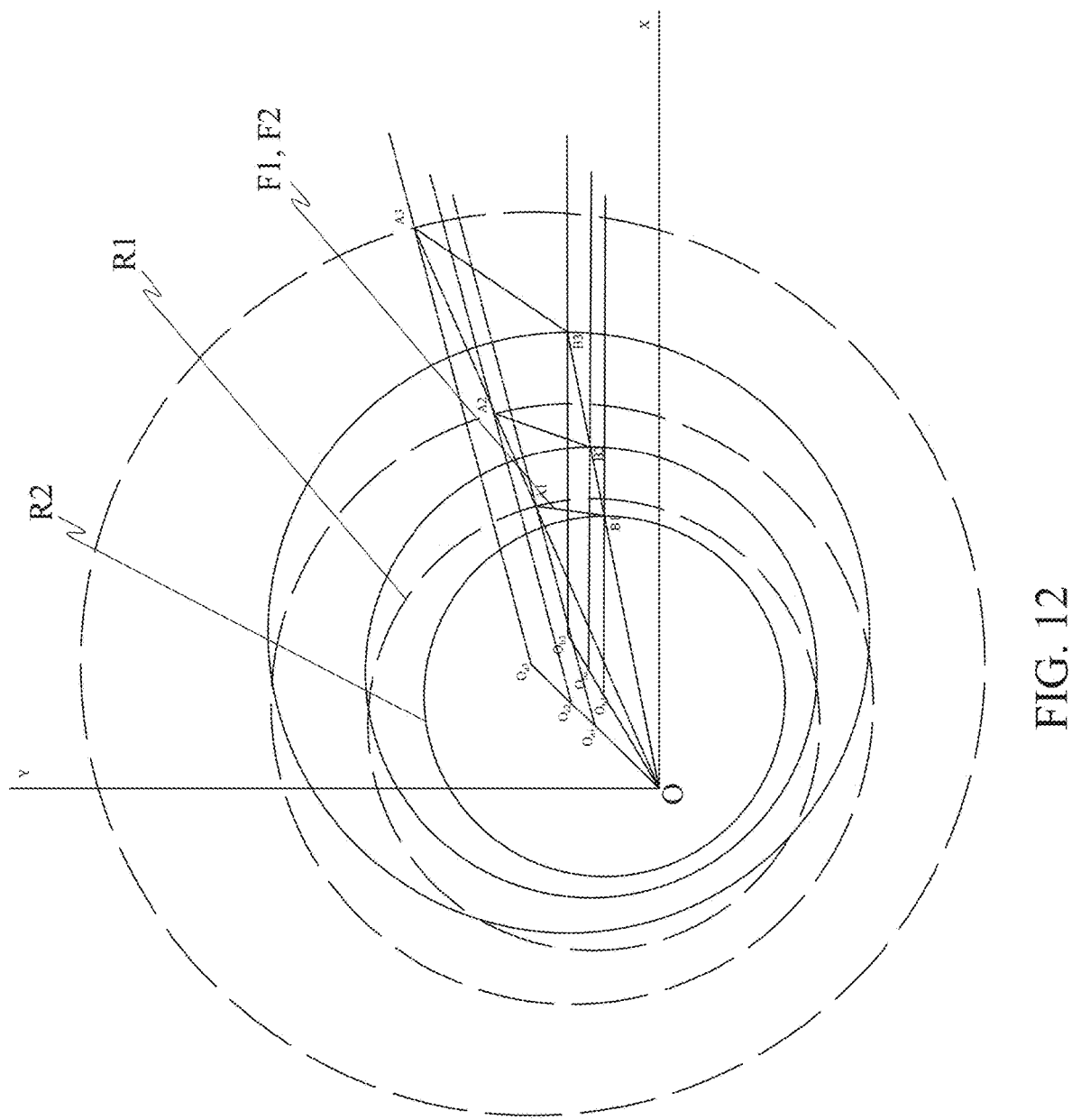
FIG. 12 illustrates set of Ring 1 (R1) depicted in broken line and set of Ring 2 (R2) depicted in solid line at different depths in FIG. 1 and FIG. 2 respectively along with the respective Field 1 (F1) and Field 2 (F2).
Figure 13:
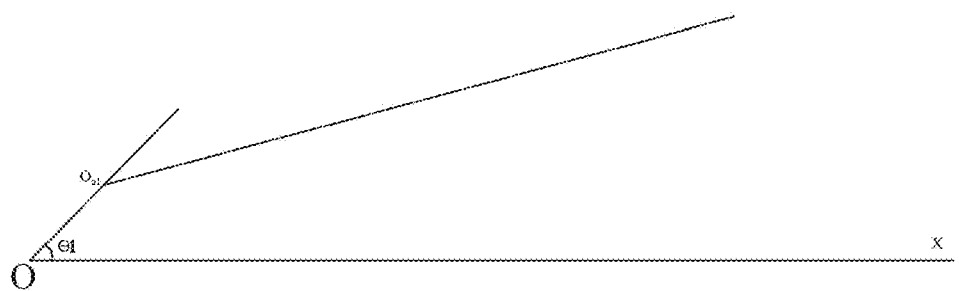
FIG. 13 depicts axis angle 1 ($\theta 1$) as depicted in FIG. 12.
Figure 14:
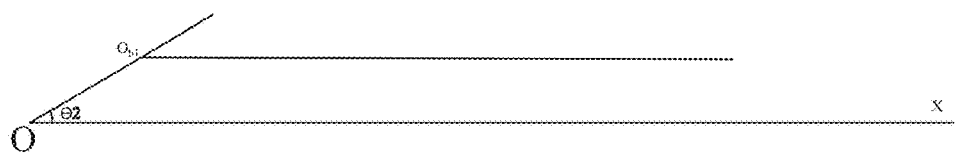
FIG. 14 depicts axis angle 2 ($\theta 2$) as depicted in FIG. 12.
Figure 15:
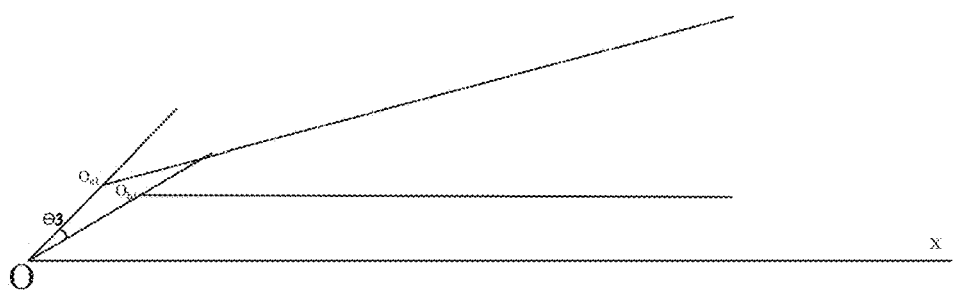
FIG. 15 depicts axis angle 3 ($\theta 3$) as depicted in FIG. 12.
Figure 16:
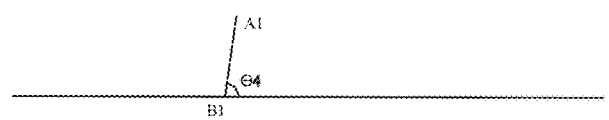
FIG. 16 depicts phase angle diagram 1 ($\theta 4$) as depicted in FIG. 12.

As shown in FIG. 11, the coordinates of a point on the ring are (Xc, Yc), and the mapping of points on the rectangular image can be established after outspreading by using the polar coordinate formula. The coordinates of the corresponding points on the rectangular image are (Xr, Yr), the width of the rectangular is 2*fl*Rmax and the height of the rectangular is Rmax–Rmin.

$$\begin{cases} [[x_c]]Xc = x_0 + (Rmax - y_r) * \cos(xr/Rmax) \\ [[y_c]]Yc = y_0 + (Rmax - y_r) * \sin(xr/Rmax) \end{cases} \quad (4)$$

Where: (Xo, Yo) is the center coordinate;
Rmax is the maximum radius of the ring;
Rmin is the minimum radius of the ring.

The outspread formula in the above S8 is not unique. It is only one of the outspread methods. The ring coordinates and the rectangular coordinates correspond one by one through the formula.

After the undistorted image is outspread, the panoramic image of the ring is outspread into a rectangular image that is convenient for stitching and observation, and finally, the undistorted outspread image is obtained.

Finally, it should be explained that the above embodiment is only used to explain the technical solution of the invention rather than restrict it. Although the invention is described in detail concerning the better embodiment, the ordinary technical personnel in this field should understand that they can still modify or replace the technical solution of the invention, and these modifications or equivalent substitutions cannot make the modified technical solution out of the spirit and protection scope of the technical solution of the invention.

What is claimed is:
1. An undistorted outspread method for annular images of the inner wall of borehole with a center offset, comprising:

a step S1 of putting a camera into the borehole and pushing the camera inward to carry out a video acquisition;

a step S2 of selecting at least two frames of images, a first image and a second image, from the video obtained from the step S1; adjusting a second axis angle in the second image to an angle same as a first axis angle in the first image to obtain an adjusted second axis angle;

a step S3 of adjusting the first axis angle and the adjusted second axis angle in the step S2 until difference between said angles is zero;

a step S4 of calculating a first radius ratio of motion according to adjusted first image and second image in the step S3, and obtaining a second radius ratio of motion;

a step S5 of obtaining a first radius ratio of axis distance according to the first radius ratio of motion in the step S4, and obtaining a second radius ratio of axis distance, wherein the first radius ratio of axis distance is ratio of the radius to a distance from a center of a circle to a center of the image;

a step S6 of correcting the first image and the second image to obtain a corrected third image and a corrected fourth image according to the calculation of the first radius ratio of axis distance and the second radius ratio of axis distance in the step S5;

a step S7 of matching the corrected third image in the step S6 along with the first image and matching the corrected fourth image in the step S6 along with the second image to obtain corrected undistorted images; and a step S8 of outspreading the corrected undistorted images from the step S7 to obtain an undistorted outspread image according to a polar coordinate formula $$\begin{cases} x = W/2 + r_2 * \cos\alpha \\ y = H/2 - r_2 * \sin\alpha \end{cases}.$$

2. The undistorted outspread method for the annular images of the inner wall of borehole with the center offset according to claim 1, wherein in the step S2, if the angle of the second axis angle is different from the angle of the first axis angle, obtaining a first phase angle diagram from the first image and the second image, and a phase angle difference obtained from a first phase angle and a second phase angle in the first phase angle diagram is equal to an axis angle difference, and rotating the second image according to the axis angle difference.

3. The undistorted outspread method for the annular images of the inner wall of borehole with the center offset according to claim 2, wherein in the step S3, obtaining a second phase angle diagram from the first image and the rotated second image, for the first axis angle and the second axis angle being non-zero, wherein all trajectory lines in the second phase angle diagram intersect, and a point with the most trajectory lines is a control point, and a first detection circle is determined using the control point as a center; obtaining a third axis angle from two points with the largest pixel gray value on the first detection circle, and rotating the first image and the rotated second image according to the third axis angle.

4. The undistorted outspread method for the annular images of the inner wall of borehole with the center offset according to claim 1, wherein in the step S4, selecting any point in the first image after rotation and calculating a radius ratio of motion for said selected point; calculating a first radius ratio diagram of motion from a radius ratio of motion calculated by all points in the first image after rotation, and obtaining a second radius ratio diagram of motion.

5. The undistorted outspread method for the annular images of the inner wall of borehole with the center offset according to claim 4, wherein the first radius ratio of motion is a ratio of distance from said selected point to a control point in the first image after rotation to distance from an endpoint of a motion trajectory to the control point.

6. The undistorted outspread method for the annular images of the inner wall of borehole with the center offset according to claim 1, wherein in the step S5, selecting points with the same pixel gray value in a first radius ratio diagram of motion and a second radius ratio diagram of motion to obtaining a first ring and a second ring, respectively, obtaining the first radius ratio of axis distance according to a center and radius of the first ring, and obtaining the second radius ratio of axis distance.

7. The undistorted outspread method for the annular images of the inner wall of borehole with the center offset according to claim 1, wherein in the step S6, obtaining a corrected first radius and first angle according to a first radius ratio diagram of motion and a second radius ratio diagram of motion, and obtaining the corrected third image and corrected fourth image from the first angle and the first radius.

8. The undistorted outspread method for the annular images of the inner wall of borehole with the center offset according to claim 1, wherein the first image and the second image both take an image center as an origin, an x-axis is a straight line from the origin to the right, wherein axis angle is an angle between the x-axis and a line connecting the image center and the borehole center, an offset axis is a connection between the image center and the borehole center, and a length of the offset axis is the axis distance.

* * * * *